H. D. YATES.
FUEL CONTROLLING DEVICE.
APPLICATION FILED MAR. 23, 1915.
1,158,094. Patented Oct. 26, 1915.
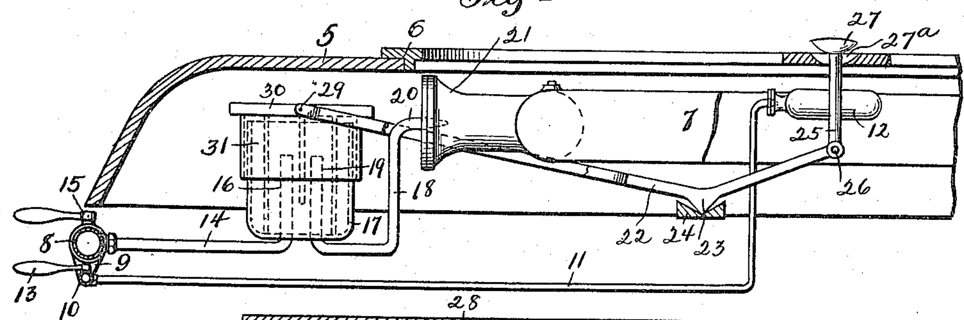
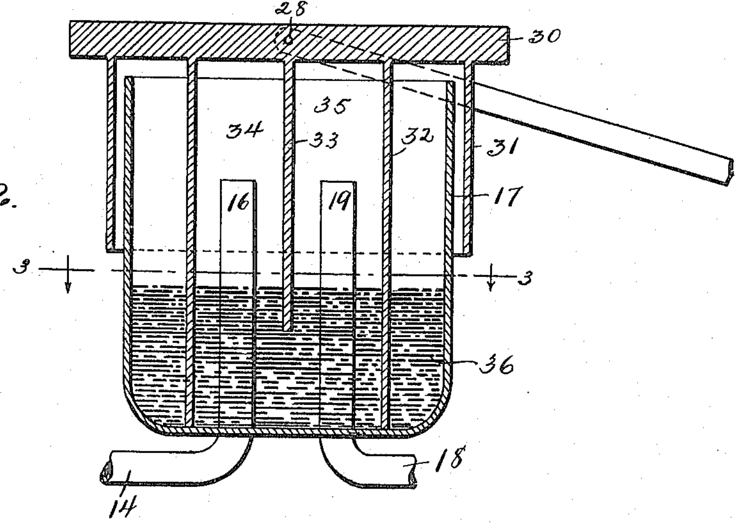
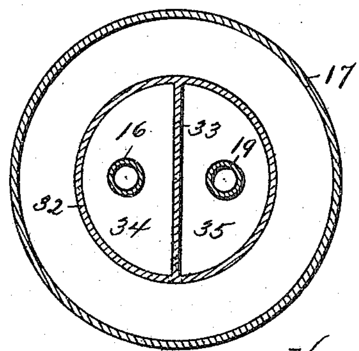
Inventor
Harry D. Yates.
Witnesses
S. Clepatch.
Helbert Campbell.
By Shepherd & Campbell.
Attorneys
COLUMBIA PLANOGRAPH CO., WASHINGTON, D. C.

UNITED STATES PATENT OFFICE.

HARRY D. YATES, OF WASHINGTON, DISTRICT OF COLUMBIA.

FUEL-CONTROLLING DEVICE.

1,158,094. Specification of Letters Patent. Patented Oct. 26, 1915.

Application filed March 23, 1915. Serial No. 16,508.

*To all whom it may concern:*

Be it known that I, HARRY D. YATES, a citizen of the United States, residing at Washington, in the District of Columbia, have invented certain new and useful Improvements in Fuel-Controlling Devices, of which the following is a specification.

This invention relates to fuel controlling devices and it has for its object the provision of a controlling mechanism adapted for ready attachment to an ordinary gas stove and so constructed and arranged that the placing of the cooking utensil upon the stove will turn on the supply of gas to the main burner, the supply of gas to said main burner being automatically cut off when the cooking utensil is removed from the stove and the gas being ignited when the cooking utensil is placed in position, by the flame from a pilot burner.

I am aware of the fact that it is not broadly new to thus turn on the gas to the main burner by the placing of a cooking utensil in position, but the present invention contemplates the provision of improved mechanism for accomplishing this object in a very simple and economical way.

It is a further object of the invention to provide a mechanism for performing the above mentioned function which mechanism will be practically frictionless, will be operable by a very light force and one that will not be likely to get out of order.

Further objects and advantages of the invention will be set forth in the detailed description which now follows.

In the accompanying drawing:—Figure 1 is a view partly in section and partly in side elevation of a fuel controlling mechanism embodying the invention. Fig. 2 is a sectional view through the valve proper, and, Fig. 3 is a horizontal section upon line 3—3 of Fig. 2.

Like numerals designate corresponding parts in all of the figures of the drawing.

In the drawing 5 designates the frame of a gas stove and 6 the usual removable grid located above the main burner 7. The main gas supply pipe is indicated at 8 and is connected by the reducing elbow 9 with a pilot burner supply pipe 10. A branch 11 leads from the pipe 10 to a pilot burner 12 of usual construction and the supply from pipe 10 to pipe 11 is controlled by an ordinary stop-cock 13. A branch pipe 14 leads from the main gas supply pipe 8 and the flow of gas thereto is controlled by stop-cock 15. The pipe 14 terminates in an upturned end 16 disposed within a fixed cup 17. A pipe 18 is provided with an upturned end 19, likewise disposed within the cup 17 and this pipe 18 terminates in a nozzle 20 projecting into the mixing chamber 21 of the main burner 7. A lever 22 is provided with a knife edge 23 which rocks upon the block 24. A rod 25 is pivoted at 26 to one end of this lever and the opposite end of this rod is provided with a head 27 which is engaged by the bottom of a cooking utensil when said cooking utensil is placed in position upon the stove. The opposite end of the lever 22 is bifurcated and its free ends are pivoted at 28 and 29 to the head 30 of a canopy constituting the movable member of the valve shown in Fig. 2. This head is provided with a depending apron 31 which projects downwardly about the upper edge of the cup 17 to prevent the entry of dust, dirt, match-stems or anything of like nature to cup 17. The head 30 further carries the depending tubular extension 32 which is divided by a partition 33 extending transversely thereacross but terminating short of the bottom thereof. This partition divides the interior of extension 32 into the chambers 34 and 35. The pipe 16 projects upwardly into chamber 34 and the pipe 19 projects upwardly into chamber 35. A liquid, preferably mercury, is indicated at 36. When no cooking utensil is upon the stove the weight of the head 30 and its associated parts together with the disposition of the fulcrum of knife edge 23 toward the rear or inner end of the lever causes the head and canopy to descend so that the parts lie in the position illustrated in Fig. 2 at which time no gas can flow from pipe 16 to pipe 19 and consequently, the supply of gas to the main burner is cut off. Since the supply to the pilot burner is not controlled by the valve shown in Fig. 2 it follows that this pilot burner continues to burn. When a cooking utensil is placed upon the stove, rod 25 is depressed until head 27 of the rod lies flush within the recess $27^a$ of grid 6. This depression of the rear or inner end of lever 22 results in lifting the canopy until the partition 33 is lifted out of the mercury 36. Gas can then flow from pipe 16 beneath the lower edge of partition 33 and into pipe 19 whereupon the main burner immediately starts to burn, the gas supplied thereto being ignited by the pilot burner. It is, of course, understood that the movement of the canopy is not sufficient to lift the extension 32 entirely out of the mercury. It is apparent that by virtue of the direct connection between head 27 and the canopy friction is reduced to a minimum. The density of the mercury is such that it tends to float the canopy to a certain extent and by properly proportioning the parts with relation to each other a very nicely balanced mechanism may be had, and one that will work with a minimum of wear, noise and friction. It will furthermore be apparent that since the mechanism herein shown and described is very simple the construction will be correspondingly economical. The valve is placed in a protected position beneath the outturned flange of the stove where it will not be likely to be struck or otherwise injured.

While the elements shown and described are well adapted to serve the purposes for which they are intended, it is to be understood that the invention is not limited to the precise construction set forth but that it includes within its purview whatever is new that comes within the spirit of the appended claims.

Having described my invention, what I claim is:—

1. The combination with the main burner of a gas stove, of a gas supply pipe leading to said main burner, a valve for controlling the passage of gas through said pipe comprising a fixed cup carrying a liquid seal into which cup separate branches of said pipe extend, a movable canopy comprising an extension depending into said cup and a partition shorter than said extension which partition divides said extension into two chambers and in which chambers the branches of said pipe terminate, and means controlled by the placing of a cooking utensil upon the stove for imparting upward movement to said canopy.

2. The combination with the main burner of a gas stove, of a gas supply pipe leading to said main burner, a valve for controlling the passage of gas through said pipe comprising a fixed cup carrying a liquid seal into which cup separate branches of said pipe extend, a movable canopy comprising an extension depending into said cup and a partition shorter than said extension which partition divides said extension into two chambers and in which chambers the branches of said pipe terminate, and means controlled by the placing of a cooking utensil upon the stove for imparting movement to said canopy, said means comprising a pivoted lever, one end of which is directly connected to said canopy, the relative weight of the parts being such that the canopy is held in such a lowered position by gravity that its lower edge and the lower edge of the partition projects into the liquid seal.

3. In a gas stove the combination with a main burner and a pilot burner, of means for supplying a constant flow of gas to said pilot burner, a lever pivoted intermediate its ends for rocking movement, means arranged to be engaged by a cooking utensil when placed in position above the main burner, said means being directly connected to one end of said lever, a gas supply line for the main burner and a controlling valve located in said gas supply line and comprising a movable member which is directly engaged by the opposite end of said lever, the latter end of said lever being normally maintained by gravity in a lowered and valve closing position.

4. In a device of the character described the combination with a main burner, a gas supply line therefrom, a fixed cup, said gas supply line comprising a pair of upturned terminal ends which enter said cup, a vertically movable head, an extension carried by said head and depending into said cup, said extension being divided by a partition into two chambers into which the said terminal ends of the gas supply line extend, said partition terminating short of the bottom of said extension, a lever mounted for rocking movement intermediate its ends, one end of which is pivotedly connected to said head and means engaging the other end of said lever and arranged to be engaged by a cooking utensil when the latter is placed on the stove, the relative weight of the parts being such that the canopy is held in such a lowered position by gravity that its lower edge and the lower edge of the partition projects into the liquid seal.

5. In a device of the character described the combination with a main gas supply pipe of an auxiliary gas supply pipe, a pilot burner, a pipe leading from the auxiliary gas supply pipe to the pilot burner, a stopcock for controlling the passage of said gas through the last named pipe, a main burner, a gas discharge nozzle for said main burner, a pipe by which said nozzle is carried, said pipe terminating in a vertical extension, a second pipe leading from the main gas supply line, a cock for controlling the flow of gas from the main gas supply line to the last named pipe, said pipe being likewise provided with a vertical extension, a fixed cup within which said vertical extensions terminate and which cup contains a quantity of mercury constituting a liquid seal, a vertically movable canopy comprising a head, an extension depending from said head, a partition dividing said extension into two chambers in which said vertical extensions terminate, an apron extending downwardly from said head on the outside of said cup, a rocking lever to one end of which said head is pivotedly connected and means pivotedly connected to the opposite end of said lever arranged to be engaged by a cooking utensil when the latter is placed upon the stove.

In testimony whereof I affix my signature.

HARRY D. YATES.

Copies of this patent may be obtained for five cents each, by addressing the "Commissioner of Patents, Washington, D. C."